Oct. 24, 1933.         C. H. WHITE         1,932,059
REEL
Filed Jan. 17, 1931         4 Sheets-Sheet 1
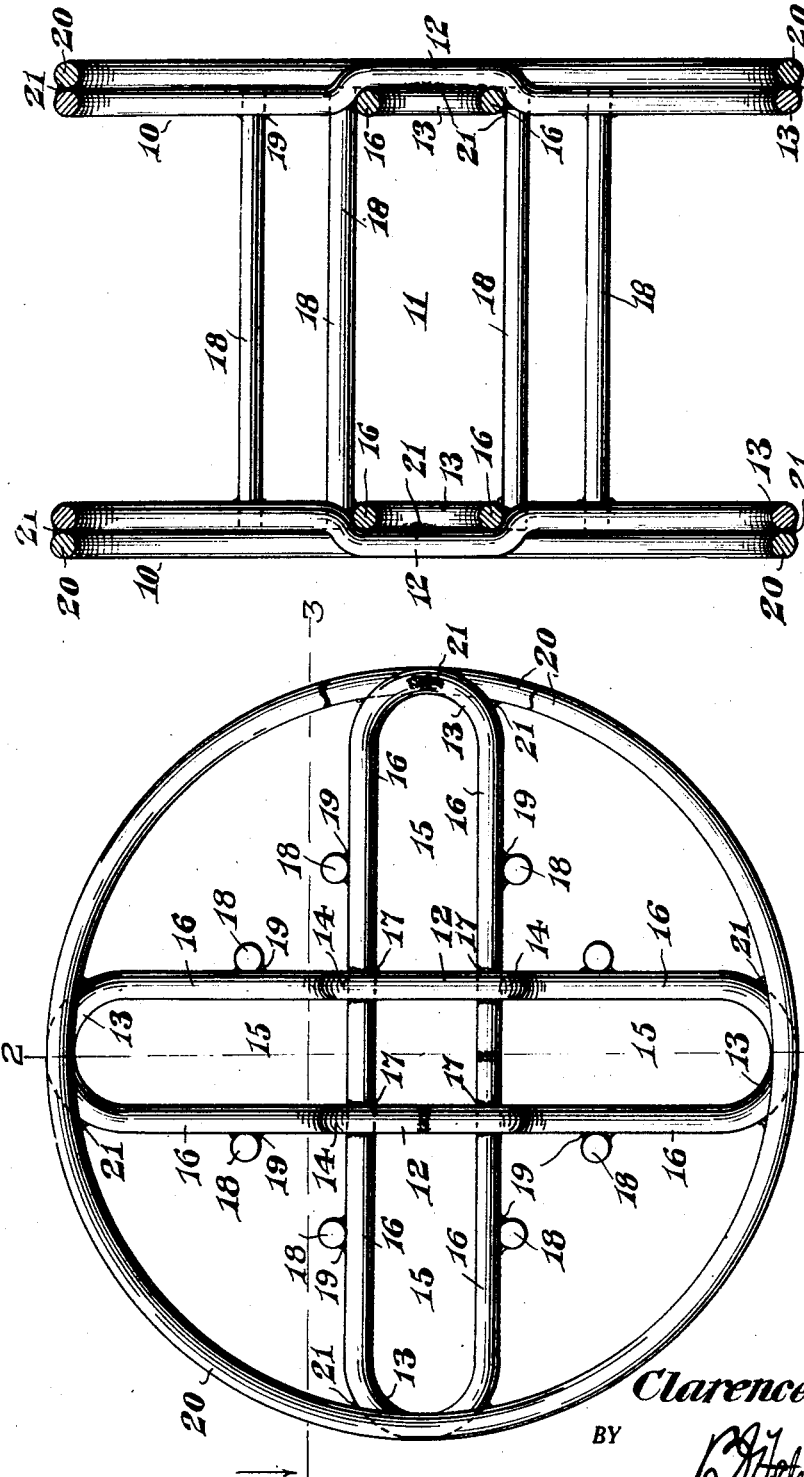
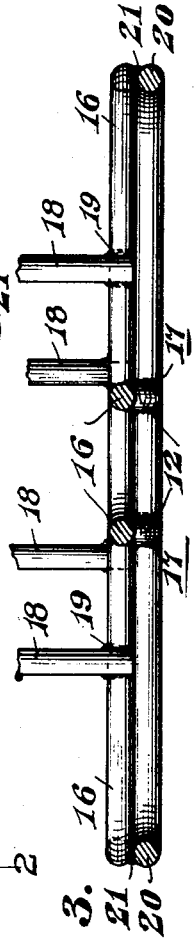
INVENTOR.
Clarence H. White,
BY
ATTORNEY.

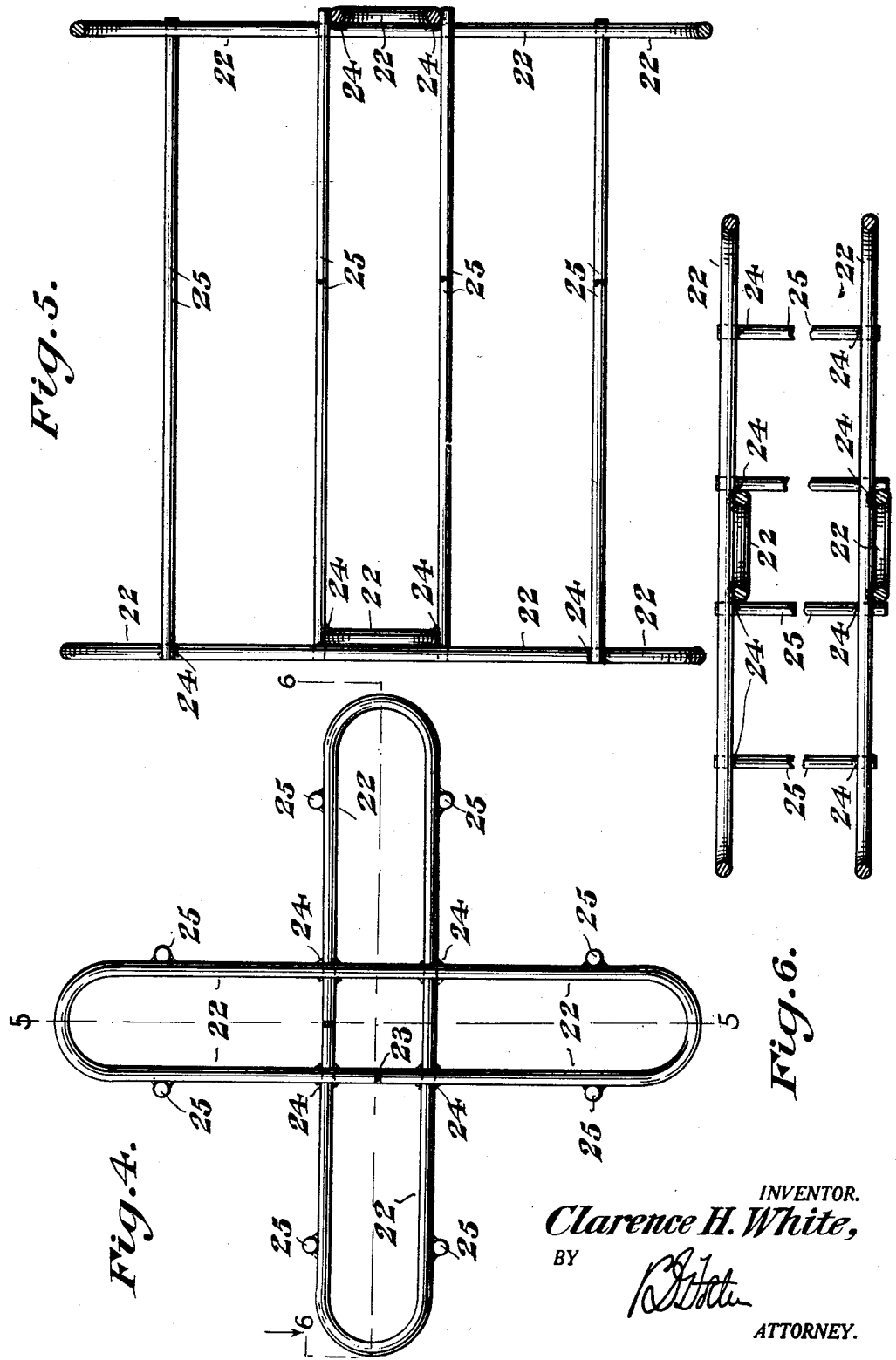

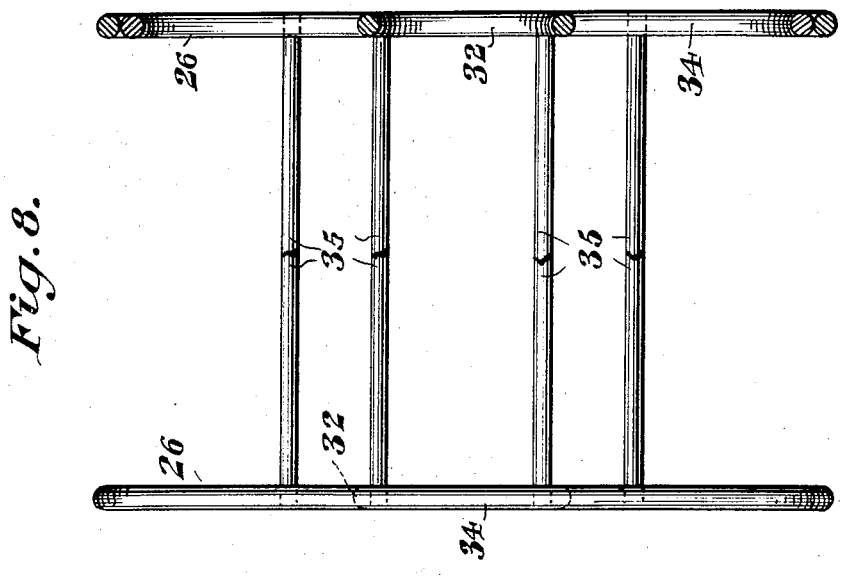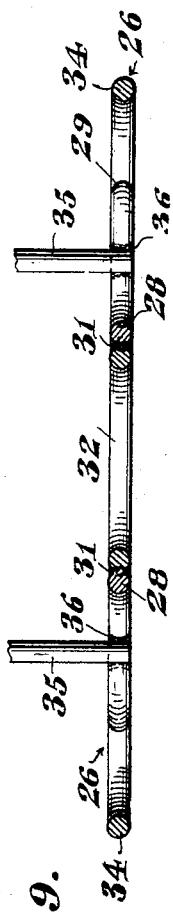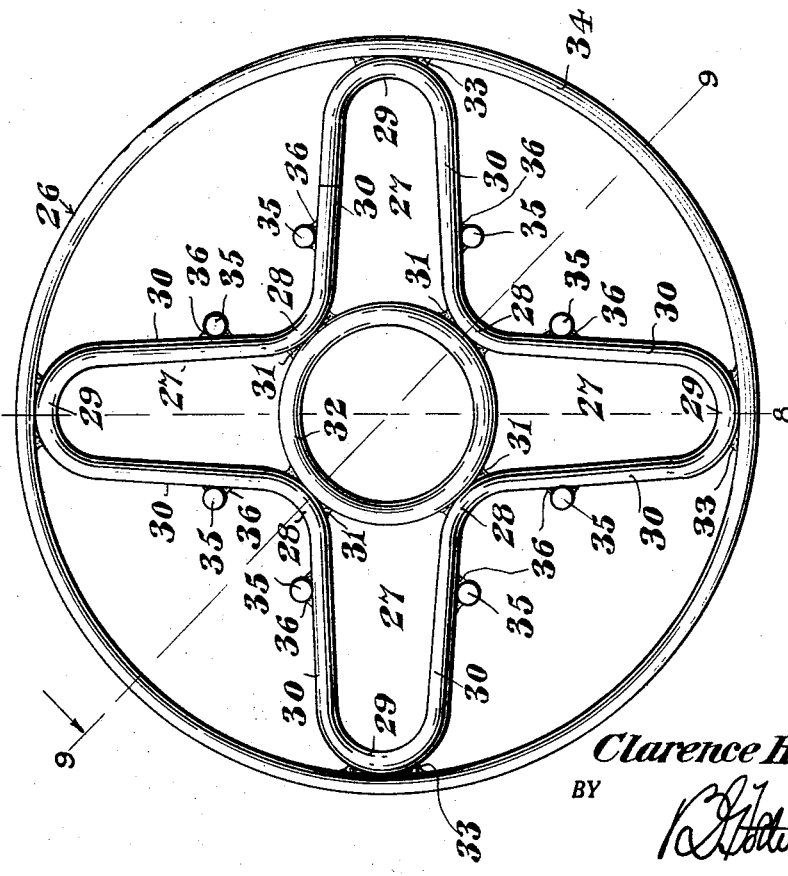

Oct. 24, 1933.   C. H. WHITE   1,932,059
REEL
Filed Jan. 17, 1931   4 Sheets-Sheet 4

Inventor
Clarence H. White,
By
Attorney

Patented Oct. 24, 1933

1,932,059

UNITED STATES PATENT OFFICE 1,932,059

REEL

Clarence H. White, Cleveland, Ohio, assignor to Truscon Steel Company, Youngstown, Ohio, a corporation of Michigan Application January 17, 1931. Serial No. 509,482

9 Claims. (Cl. 242—77)

The primary object of the present invention is to provide a reel for wire and the like, which by reason of its novel structure is strong, so that it will neither collapse under the tension or strain of material wound thereon, nor be liable to material distortion or injury under the stress of transportation.

In the accompanying drawings:

Figure 1 is an end elevation of one embodiment of the invention.

Figure 2 is a sectional view therethrough on the line 2—2 of Figure 1.

Figure 3 is a sectional view on the line 3—3 of Figure 1.

Figure 4 is a view in elevation of another form of construction.

Figure 5 is a view partly in side elevation and partly in section on the line 5—5 of Figure 4.

Figure 6 is a sectional view on the line 6—6 of Figure 4.

Figure 7 is an end elevation of still another embodiment of the invention.

Figure 8 is a view partly in side elevation and partly in section on the line 8—8 of Figure 7.

Figure 9 is a sectional view on the line 9—9 of Figure 7.

Figure 11:
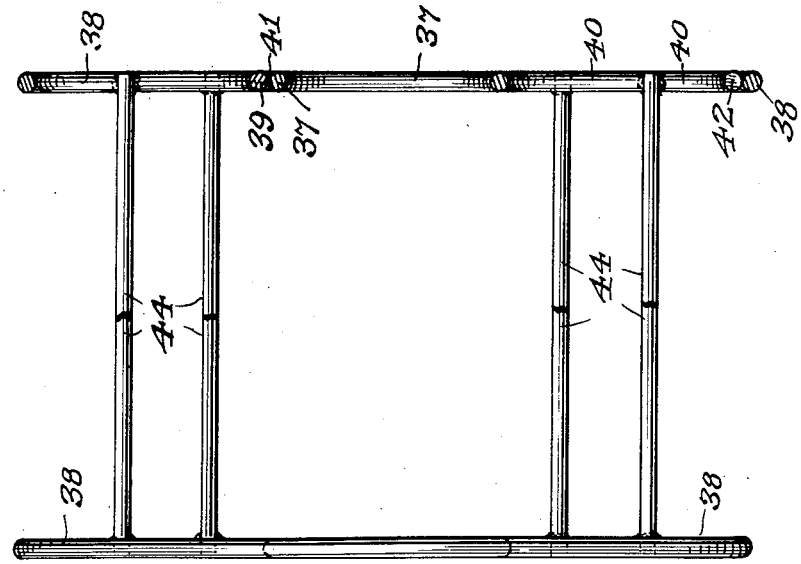
Figure 11 is a partial section on the line 11—11 of Figure 10.

Referring first to the embodiment disclosed in Figures 1, 2 and 3, the drum is formed of rods of heavy gauge wire, and comprises heads 10 connected by a core or body designated generally by the reference numeral 11. Each head consists of rods formed into continuous loops, having straight side members 12 and closed ends 13. These loops are crossed at right angles, and one has the central portion of its side member 12 offset as shown at 14 to receive the central portion of the other loop. As a consequence the end portions of the loop project radially to form what may be termed spokes 15 having straight side walls 16 connected by the closed portions 13. At the points of intersection 17 of the side members 12 they are secured together, and in the preferred form this is done by an electric welding operation, though other means for fastening may be employed.

The core or body 11 of the reel is formed by a series of cross rods 18 arranged to produce a substantially circular form, the ends of the rods lying against the side arms 16 of the spokes 15, preferably between the points of welding or securing 17 and the outer closed ends 15, and being welded thereto as at 19.

In order that the reel may be rolled and at the same time may be strong to reenforce the ends of the spokes 15, there are preferably employed rims in the form of circular rings 20 that are engaged with the closed ends 13 and are welded thereto, as shown at 21, or otherwise suitably secured.

A structure of this character is one that is made up of easily formed parts that can be quickly assembled and readily secured together. The reel is strong and will withstand the strain of wire when being wound thereupon, and will also withstand rough usage in transportation and operation.

A more simple form of structure is shown in Figures 4, 5 and 6. In this embodiment the same general type of loops is illustrated at 22, each being formed of a rod or heavy wire with its ends welded together as shown at 23. A pair of these loops is located in crossed right angular relation and are welded at their points of intersection as shown at 24. Two heads thus formed are connected by cross rods 25 welded, as in the first described structure, to the side arms of the loops. In this embodiment as disclosed neither of the loops is offset so that the spokes lie in different planes, as distinguished from that of the first described structure, wherein the spokes are located in the same plane. Obviously this is a cheaper form of reel but is sufficient for many purposes.

An additional embodiment of the invention is illustrated in Figures 7, 8 and 9. Herein each head 26 has spokes 27, all formed from a single rod bent into a series of outstanding loops formed by reverse bends 28 and 29 with side arms 30 connecting the same. The inner bends 28 are preferably welded as shown at 31, or otherwise suitably secured to a central ring 32 which may constitute a bearing element if the reel is placed on a spindle. The outer bends 29 are also preferably connected by welding 33 or other suitable means to a rim or hoop 34 that surrounds the outer ends of the spokes 27.

The side arms 30 are connected by cross rods 35 having their ends welded as shown at 36 or otherwise fastened to said side arms 30. The rods 35 obviously constitute the core, barrel or body of the reel between the heads 26. This form of reel, like that of Figures 1, 2 and 3 can be rolled or mounted on a spindle so that it can be easily revolved to wind wire or other material thereon and permit its being unwound therefrom.

Figure 10:
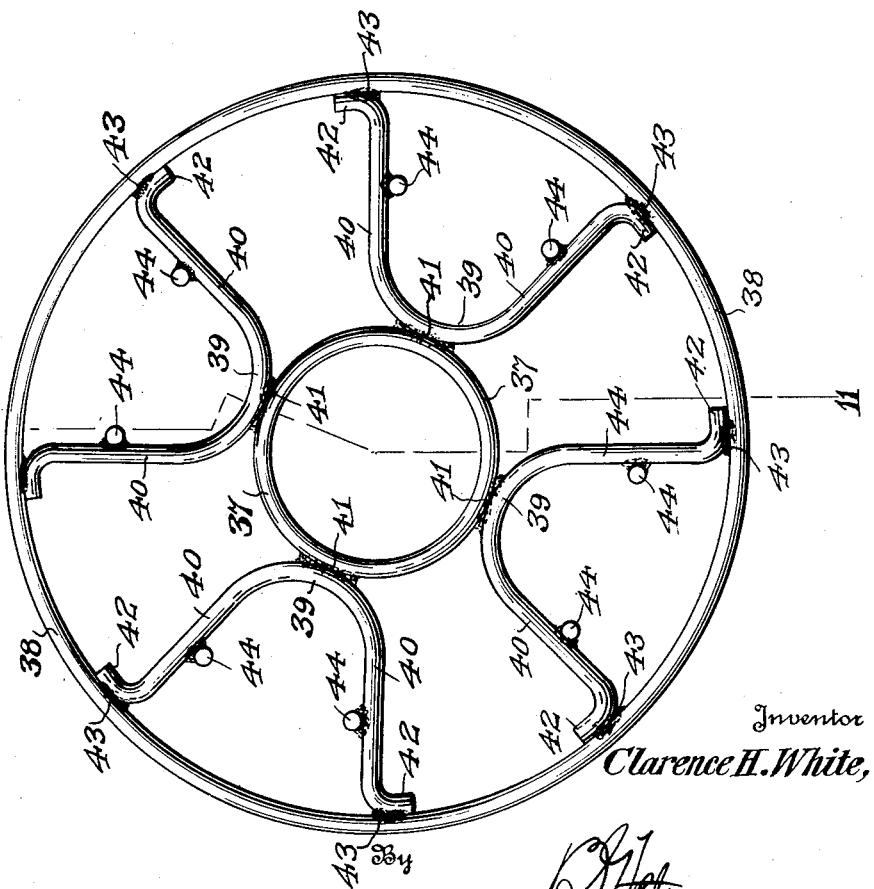
Figure 10 is an end elevation of another form of construction.

In the form of construction shown in Figures 10 and 11, each head consists of a central ring 37 and an outer ring 38, the latter constituting a rim. Interposed between the inner and outer rings, are a series of spokes formed by a plurality of U-shaped looped rods 39, providing divergent side arms 40. The central portions or bends of the rods are welded, as indicated at 41 to the central ring 37, while the terminals are outset, as shown at 42, and welded to the inner side of the ring 38, as illustrated at 43. The body or core of the reel is formed by cross rods 44 extending between the heads and having their ends welded to the side arms 40.

From the foregoing it is thought that the construction, operation and many advantages of the herein described invention will be apparent to those skilled in the art without further description and it will be understood that various changes in the size, shape, proportion and minor details of construction may be resorted to without departing from the spirit or sacrificing any of the advantages of the invention.

What I claim, is:

1. A reel comprising heads formed of looped rods each loop forming a plurality of spokes and a core connecting the heads and secured to both spokes of each of corresponding loops between their inner and outer ends and at points spaced from adjacent spokes.

2. A reel comprising heads consisting of rods formed into outstanding loops, each loop having a plurality of spaced side arms, and a core connecting the heads and separately secured to the side arms of each of the loops at points spaced from the side arms of adjacent loops.

3. A reel comprising heads formed of looped rods each loop forming spaced spokes and a core connecting the heads and comprising a plurality of spaced rods for each loop secured at their ends to the spokes of each loop between their inner and outer ends and independent of the rods connected to the spokes of the other loops.

4. A reel comprising heads consisting of rods formed into outstanding loops, each loop having spaced side arms, and a core connecting the heads and comprising a set of cross rods for the side arms of each loop and secured to the respective side arms of such loop independent of the connection of the cross rods connected to the other loops.

5. A reel comprising heads, each head consisting of rods formed into loops, each loop forming a plurality of spokes the loops being crossed and secured together at their intersections, and a core comprising a plurality of rods for each loop, said rods extending between the heads and each being connected to one of the side arms of each of the loops.

6. A reel comprising heads, each head consisting of rods formed into continuous loops and each rod with its ends secured together, the loops having their central portions crossed and the rods being secured together at their points of intersection, said loops having outstanding closed portions, each provided with side rods, and a core comprising a cross rod for each side arm of the loops, said cross rods extending between the heads and having their ends independently secured to the corresponding side arms of the outstanding portions of the loops outside and in spaced relation to the crossing points of the loop rods.

7. A reel comprising heads, each head consisting of rods formed into continuous loops and each rod with its ends secured together, the loops having their central portions crossed and the rods being welded together at their points of intersection, said loops having outstanding closed portions, each provided with side rods, and a core comprising cross rods extending between the heads, one for each side rod, said cross rods having their ends individually welded to the corresponding side arms of the outstanding portions of the loops.

8. A reel comprising heads, each head consisting of rods formed into continuous loops and each with its ends secured together, the loops having their central portions crossed and the rods being secured together at their points of intersection, the central portions of certain of the loops being offset, thereby providing outstanding closed portions that lie in substantially the same plane, and a core comprising cross rods extending between the heads and having their ends secured to the corresponding side arms of the outstanding portions of the loops.

9. A reel comprising heads, each head consisting of crossed elongated loops having side arms and outer closed ends forming spokes, said side arms being crossed and secured together at their points of intersection, a substantially circular rim connecting the outer closed ends of the loops of each head, and a core connecting the heads and comprising spaced rods having their ends secured to the side arms between their points of intersection and the outer closed ends of the loops and in spaced relation to said points of intersection.

CLARENCE H. WHITE.